US012593022B2

(12) United States Patent
Yamamoto

(10) Patent No.: US 12,593,022 B2
(45) Date of Patent: Mar. 31, 2026

(54) STEREOSCOPIC DISPLAY SYSTEM AND LIQUID CRYSTAL SHUTTER DEVICE

(71) Applicant: Sharp Display Technology Corporation, Kameyama City (JP)

(72) Inventor: Keiichi Yamamoto, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/889,890

(22) Filed: Sep. 19, 2024

(65) Prior Publication Data

US 2025/0113019 A1 Apr. 3, 2025

(30) Foreign Application Priority Data

Oct. 3, 2023 (JP) ................................. 2023-172086

(51) Int. Cl.
| | |
|---|---|
| *H04N 13/337* | (2018.01) |
| *G02B 30/25* | (2020.01) |
| *G02F 1/01* | (2006.01) |
| *G02F 1/133* | (2006.01) |
| *H04N 13/341* | (2018.01) |
| *H04N 13/398* | (2018.01) |

(52) U.S. Cl.
CPC ........... *H04N 13/337* (2018.05); *G02B 30/25* (2020.01); *G02F 1/0136* (2013.01); *G02F 1/13306* (2013.01); *H04N 13/341* (2018.05); *H04N 13/398* (2018.05); *H04N 2213/008* (2013.01)

(58) Field of Classification Search
CPC .. H04N 13/337; H04N 13/341; H04N 13/398; H04N 2213/008; H04N 13/315; G02B 30/25; G02B 30/24; G02B 30/31; G02F 1/0136; G02F 1/13306
See application file for complete search history.

(56) References Cited

U.S. PATENT DOCUMENTS

| | | | | |
|---|---|---|---|---|
| 8,537,292 B2 * | 9/2013 | Lin | ........................ | G02B 30/31 |
| | | | | 348/51 |
| 8,553,162 B2 * | 10/2013 | Yamaguchi | .......... | H04N 13/337 |
| | | | | 349/75 |
| 9,402,071 B2 * | 7/2016 | Niwano | ............... | H04N 13/324 |

(Continued)

FOREIGN PATENT DOCUMENTS

| | | |
|---|---|---|
| EP | 2423909 A1 | 2/2012 |
| JP | 2002-101427 A | 4/2002 |

(Continued)

OTHER PUBLICATIONS

Co-pending letter regarding a related co-pending U.S. Appl. No. 18/217,644, filed Jul. 3, 2023.

*Primary Examiner* — Dramos Kalapodas
(74) *Attorney, Agent, or Firm* — ScienBiziP, P.C.

(57) ABSTRACT

A stereoscopic display system includes a display panel and a liquid crystal shutter device. The liquid crystal shutter device includes a liquid crystal layer, a segment electrode, a counter electrode, an auxiliary electrode, an insulating layer, and a drive circuit. The drive circuit applies a drive voltage to the segment electrode in synchronization with a switching of a display of the display panel. Also, the drive circuit applies a voltage having an opposite phase to the voltage applied to the segment electrode to the auxiliary electrode.

7 Claims, 10 Drawing Sheets

(56)  References Cited

U.S. PATENT DOCUMENTS

| | | | |
|---|---|---|---|
| 9,906,777 B2 * | 2/2018 | Kikuchi | G02F 1/134363 |
| 12,105,867 B2 | 10/2024 | von und zu Liechtenstein | |
| 2007/0229951 A1 | 10/2007 | Jung et al. | |
| 2009/0201362 A1 | 8/2009 | Shestak | |
| 2011/0170026 A1 * | 7/2011 | Lin | G02B 30/31 |
| | | | 349/15 |
| 2013/0141402 A1 * | 6/2013 | Lee | G02B 5/3083 |
| | | | 345/204 |
| 2014/0063211 A1 | 3/2014 | Fang | |
| 2014/0198099 A1 * | 7/2014 | Tseng | G02B 30/31 |
| | | | 345/419 |
| 2015/0109269 A1 | 4/2015 | Sung | |
| 2016/0091725 A1 * | 3/2016 | Kim | G02F 1/133528 |
| | | | 349/15 |
| 2016/0202564 A1 * | 7/2016 | Kim | G02F 1/134309 |
| | | | 257/72 |
| 2017/0251202 A1 * | 8/2017 | Hamagishi | H04N 13/315 |
| 2018/0052342 A1 | 2/2018 | Chang | |
| 2020/0333909 A1 * | 10/2020 | Chen | G06F 3/0412 |
| 2021/0072821 A1 | 3/2021 | von und zu Liechtenstein | |
| 2023/0333402 A1 * | 10/2023 | Hasegawa | G02B 30/25 |

FOREIGN PATENT DOCUMENTS

| | | | |
|---|---|---|---|
| JP | 2013-235208 A | 11/2013 | |
| JP | 5426078 B2 | 2/2014 | |

* cited by examiner

COMPARATIVE EXAMPLE

VOLTAGE APPLIED
TO LIQUID CRYSTAL
LAYER 30

- - - - FIRST EXAMPLE
-·-·-· SECOND EXAMPLE
········ THIRD EXAMPLE
-------- FOURTH EXAMPLE
——— FIFTH EXAMPLE

Voff
GND                                                            →TIME
–Voff

501

STEREOSCOPIC DISPLAY SYSTEM AND LIQUID CRYSTAL SHUTTER DEVICE

CROSS-REFERENCE TO RELATED APPLICATIONS

This application claims the benefit of priority to Japanese Patent Application Number 2023-172086 filed on Oct. 3, 2023. The entire contents of the above-identified application are hereby incorporated by reference.

BACKGROUND

Technical Field

The disclosure relates to a stereoscopic display system and a liquid crystal shutter device.

A stereoscopic display system and a liquid crystal shutter device are known. Such a stereoscopic display system is described, for example, in JP 2013-235208 A. The stereoscopic display system of JP 2013-235208 A includes a display panel, a liquid crystal shutter device, and polarizing glasses. The display panel alternately displays a left-eye image and a right-eye image in a time-divisional manner. The liquid crystal shutter device converts the display light into left-handed circularly-polarized light and right-handed circularly-polarized light in synchronization with the display period of the left-eye image and the right-eye image. The polarizing glasses shield the right-eye image and deliver only the left-eye image to the left eye of the viewer wearing the polarizing glasses, and shield the left-eye image and deliver only the right-eye image to the right eye of the viewer.

SUMMARY

A known liquid crystal shutter device as described in JP 2013-235208 A includes a liquid crystal layer, and a first electrode and a second electrode respectively on either side of the liquid crystal layer. The liquid crystal shutter device applies a voltage to the first electrode and sets the second electrode at a fixed potential to generate a potential difference across both sides of the liquid crystal layer, thereby driving the liquid crystals of the liquid crystal layer.

However, this known liquid crystal shutter device has resistance in a wiring line for supplying a voltage from a power source to the first electrode, and resistance in a wiring line and a common transition material for connecting the second electrode to a fixed potential. Thus, when the voltage is supplied to the first electrode, the potential of the second electrode changes from the fixed potential due to the resistance of the wiring line, the resistance of the common transition material, and the electric capacitance of the liquid crystal layer, and the time constant of the waveform of the voltage applied to the liquid crystal layer (the potential difference between the first electrode and the second electrode) increases. As a result, there is a problem in that the switching of the polarization state by the liquid crystal shutter device is delayed with respect to the display timing of the display panel.

The disclosure has been made to solve the problems described above and an object of the disclosure is to provide a stereoscopic display system and a liquid crystal shutter device capable of preventing a delay in the timing when the polarization state of light is changed by the liquid crystal shutter device with respect to the display timing of the display panel.

In order to solve the problems described above, a stereoscopic display system according to a first aspect of the disclosure includes: a display panel configured to alternately switch and display a left-eye image and a right-eye image; and a liquid crystal shutter device configured to switch between a state where light incident from the display panel is changed into emission light having a first polarization state and the emission light is output and a state where light incident from the display panel is changed into emission light having a second polarization state and the emission light is output, wherein the liquid crystal shutter device includes: a first electrode; a second electrode connected to a fixed potential; a liquid crystal layer arranged between the first electrode and the second electrode; a drive circuit configured to apply, to the first electrode, any one of a first voltage changing a polarization state of the emission light into the first polarization state and a second voltage changing the polarization state of the emission light into the second polarization state, the drive circuit being configured to switch a voltage applied to the first electrode between the first voltage and the second voltage in synchronization with the display panel switching between a display of the left-eye image and a display of the right-eye image; and a third electrode arranged on a side of the second electrode opposite to a side where the liquid crystal layer is arranged, and the drive circuit applies a third voltage having an opposite phase to the voltage applied to the first electrode to the third electrode.

A liquid crystal shutter device according to a second aspect is configured to switch between a state where light incident from a display panel configured to alternately switch and display a left-eye image and a right-eye image is changed into emission light having a first polarization state and the emission light is output and a state where light incident from the display panel is changed into emission light having a second polarization state and the emission light is output, and includes: a first electrode; a second electrode connected to a fixed potential; a liquid crystal layer arranged between the first electrode and the second electrode; a drive circuit configured to apply, to the first electrode, any one of a first voltage changing a polarization state of the emission light into the first polarization state and a second voltage changing the polarization state of the emission light into the second polarization state, the drive circuit being configured to switch a voltage applied to the first electrode between the first voltage and the second voltage in synchronization with the display panel switching between a display of the left-eye image and a display of the right-eye image; and a third electrode arranged on a side of the second electrode opposite to a side where the liquid crystal layer is arranged, wherein the drive circuit applies a third voltage having an opposite phase to the voltage applied to the first electrode to the third electrode.

Here, the potential of the second electrode changes with respect to the fixed potential due to the first voltage being applied to the first electrode. According to the configuration described above, the third voltage having an opposite phase to the voltage applied to the first electrode is applied to the third electrode. Thus, the potential of the second electrode can be changed in a phase opposite to the change in potential caused by the first voltage. As a result, since the change in the potential caused by the third voltage is cancelled out by the change in the potential caused by the first voltage, it is possible to prevent an increase in the time constant of the waveform of the voltage applied to the liquid crystal layer (rounding of the waveform). Accordingly, a delay in the timing when the polarization state of the light emitted from the liquid crystal shutter device is switched with respect to the timing when the voltage applied to the first electrode is switched between the first voltage and the second voltage is prevented. The timing when the voltage applied to the first electrode is switched between the first voltage and the second voltage is synchronized with the timing (display timing) when the left-eye image and the right-eye image are switched, so that it is possible to prevent a delay in the timing when the polarization state of light is changed by the liquid crystal shutter device with respect to the display timing of the display panel.

BRIEF DESCRIPTION OF DRAWINGS

The disclosure will be described with reference to the accompanying drawings, wherein like numbers reference like elements.

DESCRIPTION OF EMBODIMENTS

Figure 1:
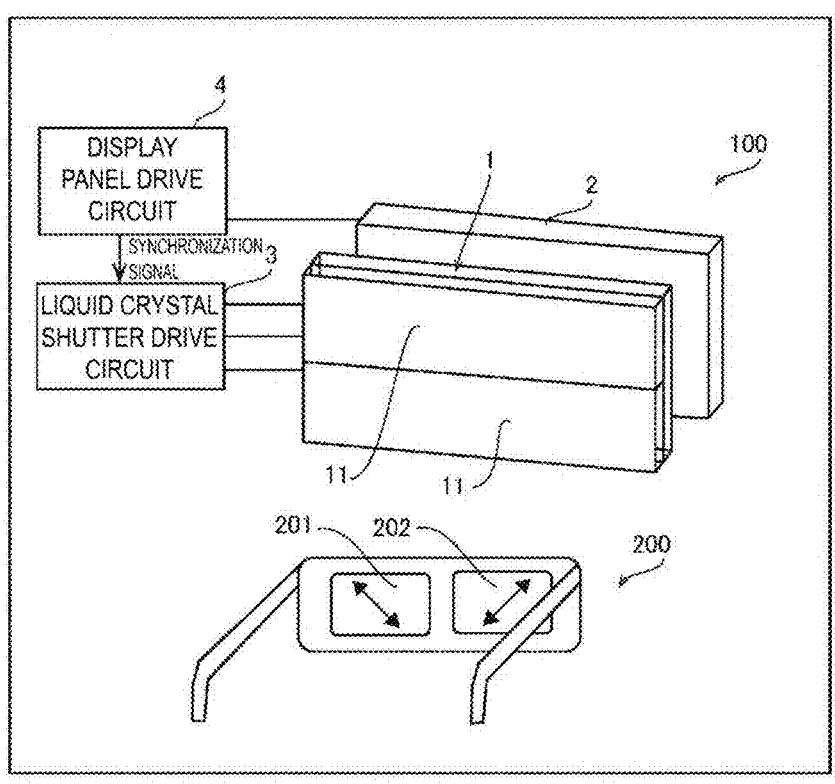
FIG. 1 is a schematic view illustrating a configuration of a stereoscopic display system 100 according to a first embodiment.

Embodiments of the disclosure will be described below with reference to the drawings. Note that the disclosure is not limited to the following embodiments, and appropriate design changes can be made within a scope that satisfies the configuration of the disclosure. In the description below, the same reference signs are used in common among the different drawings for portions having the same or similar functions, and repeated description thereof will be omitted. Further, the configurations described in the embodiments and the modified examples may be combined or modified as appropriate within a range that does not depart from the gist of the disclosure. For ease of explanation, in the drawings referenced below, the configuration is simplified or schematically illustrated, or a portion of the components is omitted. Further, dimensional ratios between components illustrated in the drawings are not necessarily indicative of actual dimensional ratios.

First Embodiment

FIG. 1 is a schematic view illustrating a configuration of a stereoscopic display system 100 according to a first embodiment. As illustrated in FIG. 1, the stereoscopic display system 100 is a system (apparatus) that allows a user wearing polarizing glasses 200 to see a stereoscopic image.

The stereoscopic display system 100 alternately switches between displaying a left-eye image and a right-eye image. The polarization state of the left-eye image output from the stereoscopic display system 100 is different from the polarization state of the right-eye image. For example, with the light emitted from the stereoscopic display system 100 being linearly polarized light, the polarization direction of the left-eye image differs from the polarization direction of the right-eye image by 90 degrees. In the first embodiment, one of the polarization direction of the left-eye image and the polarization direction of the right-eye image is −45 degrees and the other one is +45 degrees. However, one of the polarization direction of the left-eye image and the polarization direction of the right-eye image may be 0 degrees and the other one may be 90 degrees. A polarizing film 201 that transmits light in the polarization direction of the left-eye image and blocks light in the polarization direction of the right-eye image is arranged in a left-eye rim of the polarizing glasses 200. Furthermore, a polarizing film 202 that transmits light in the polarization direction of the right-eye image and blocks light in the polarization direction of the left-eye image is arranged in a right-eye rim of the polarizing glasses 200. That is, the stereoscopic display system 100 is an active retarder type stereoscopic image display system (3D image display system).

As illustrated in FIG. 1, the stereoscopic display system 100 includes a liquid crystal shutter device 1, a display panel 2, a liquid crystal shutter drive circuit 3 (hereinafter referred to as "drive circuit 3"), and a display panel drive circuit 4 (hereinafter referred to as "drive circuit 4"). In FIG. 1, the liquid crystal shutter device 1, the display panel 2, the drive circuit 3, and the drive circuit 4 are illustrated as being separated from each other for facilitating the description, but at least two components among the liquid crystal shutter device 1, the display panel 2, the drive circuit 3, and the drive circuit 4 may be integrally arranged in contact with each other. For example, the liquid crystal shutter device 1, the display panel 2, the drive circuit 3, and the drive circuit 4 may be arranged in a housing (not illustrated).

The display panel 2 alternately displays the left-eye image and the right-eye image. Further, the display panel 2 alternately displays the left-eye image and the right-eye image for each frame. Note that the display panel 2 is not limited to the present example, and may be configured to alternately display the left-eye image and the right-eye image every predetermined period (for a plurality of frames). The display panel 2 is configured as a liquid crystal display panel or an organic EL panel.

The drive circuit 4 supplies, to the display panel 2, drive signals (a gate signal and a source signal) to control the display panel 2 so as to drive the display panel 2. The drive circuit 4 updates an image on the display panel 2 at a predetermined display timing (refresh rate). Subsequently, the drive circuit 4 transmits a synchronization signal synchronized with the display timing to the drive circuit 3.

Configuration of Liquid Crystal Shutter Device 1

Figure 2:
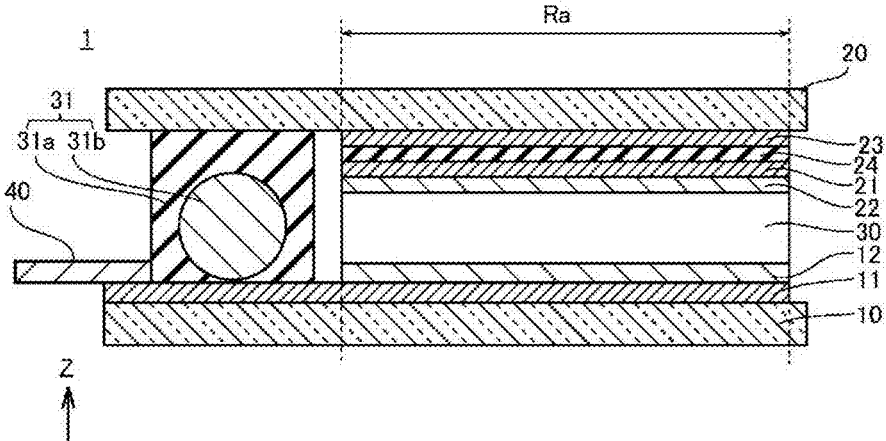
FIG. 2 is a cross-sectional view of the liquid crystal shutter device 1 according to the first embodiment.
Figure 3:
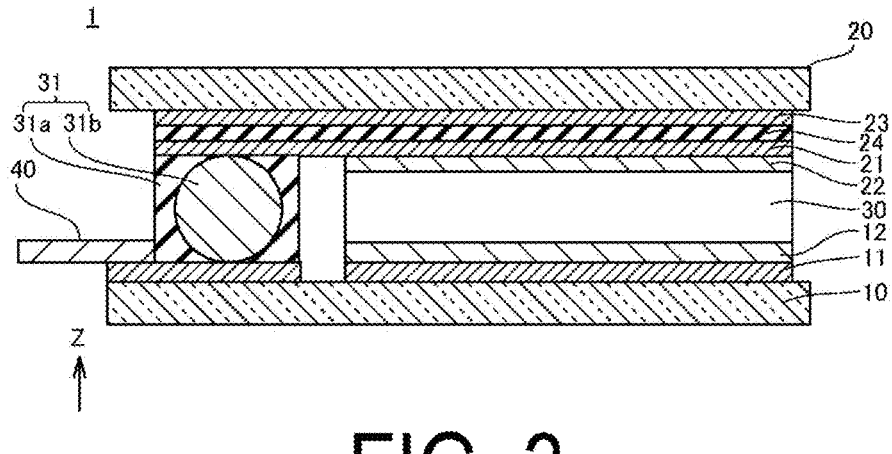
FIG. 3 is a cross-sectional view illustrating a configuration of a connection portion between a counter electrode 21 and a wiring line section 40 of the liquid crystal shutter device 1 according to the first embodiment.
Figure 4:
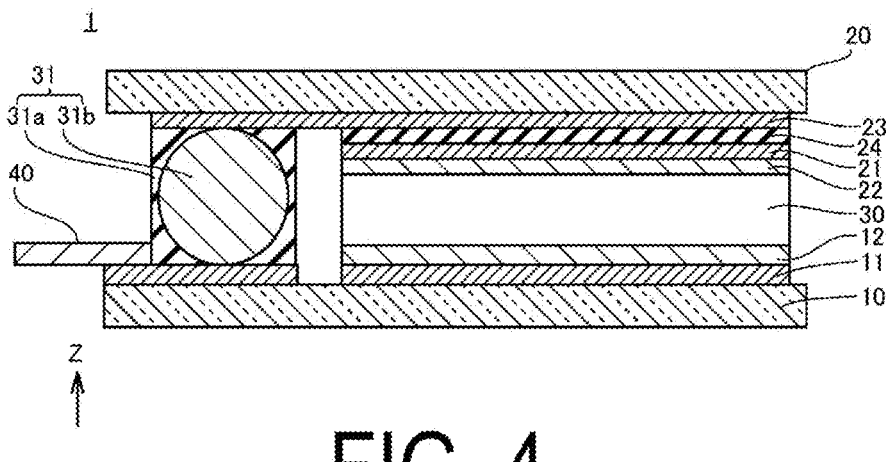
FIG. 4 is a cross-sectional view illustrating a configuration of a connection portion between an auxiliary electrode 23 and the wiring line section 40 of the liquid crystal shutter device 1 according to the first embodiment.
Figure 5:
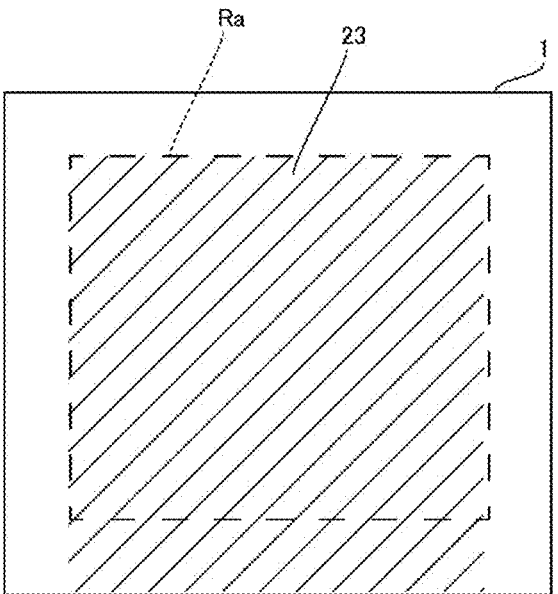
FIG. 5 is a plan view of the liquid crystal shutter device 1 according to the first embodiment.
Figure 6:
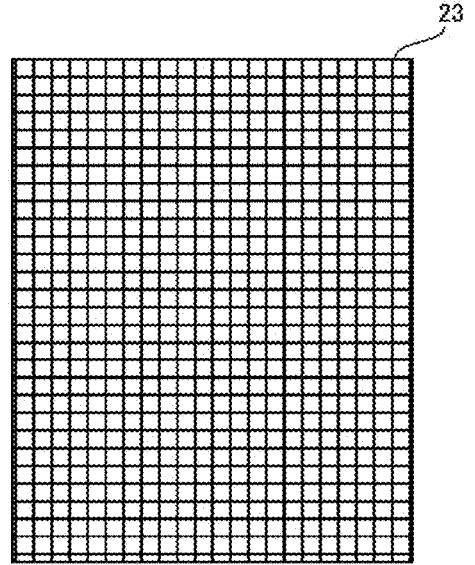
FIG. 6 is a plan view of the auxiliary electrode 23.

FIG. 2 is a cross-sectional view of the liquid crystal shutter device 1 according to the first embodiment. FIG. 3 is a cross-sectional view illustrating a configuration of a connection portion between a counter electrode 21 and a wiring line section 40 of the liquid crystal shutter device 1 according to the first embodiment. FIG. 4 is a cross-sectional view illustrating a configuration of a connection portion between an auxiliary electrode 23 and the wiring line section 40 of the liquid crystal shutter device 1 according to the first embodiment. FIG. 5 is a plan view of the liquid crystal shutter device 1 according to the first embodiment. FIG. 6 is a plan view of the auxiliary electrode 23. The liquid crystal shutter device 1 is a panel that switches between a state where light incident from the display panel 2 is changed into emission light having a polarization direction of −45 degrees and the emission light is output and a state where light incident from the display panel 2 is changed into emission light having a polarization direction of +45 degrees and the emission light is output. The liquid crystal shutter device 1 includes a first substrate 10 and a second substrate 20 arranged to face the first substrate 10. The liquid crystal shutter device 1 includes a plurality of segment electrodes 11, an alignment film 12, a plurality of counter electrodes 21, an alignment film 22, a plurality of the auxiliary electrodes 23, an insulating layer 24, a liquid crystal layer 30, a sealing portion 31, and the wiring line section 40. The wiring line section 40 is, for example, a flexible printed circuit board, and a plurality of wiring lines (not illustrated) are provided therein. For example, the first substrate 10 and the second substrate 20 include a glass substrate or a resin substrate that transmits light. The plurality of segment electrodes 11 is an example of a "plurality of first electrode portions". The plurality of counter electrodes 21 are an example of a "plurality of second electrode portions". The plurality of auxiliary electrodes 23 are an example of a "plurality of third electrode portions".

As illustrated in FIG. 2, the plurality of segment electrodes 11 are arranged on the first substrate 10. The plurality of segment electrodes 11 are connected to the drive circuit 3 via the wiring line section 40. The alignment film 12 covers a region Ra (see FIG. 5) of the plurality of segment electrodes 11 where light from the display panel 2 is transmitted and light is emitted from the liquid crystal shutter device 1. The alignment film 12 is arranged between the plurality of segment electrodes 11 and the liquid crystal layer 30. The alignment film 12 transmits light in a predetermined polarization direction. For example, the plurality of segment electrodes 11 are formed of a transparent conductive material such as indium tin oxide (ITO) and indium zinc oxide (IZO). The plurality of segment electrodes 11 may be formed of a metal conductive material formed in a mesh shape.

As illustrated in FIG. 3, the plurality of counter electrode 21 is arranged on the second substrate 20. The counter electrode 21 is arranged at a position overlapping one of the plurality of segment electrodes 11 in a plan view of the liquid crystal shutter device 1 (viewed in the Z direction). The plurality of counter electrodes 21 are connected, via the sealing portion 31 (common transition) arranged between the first substrate 10 and the second substrate 20, to the wiring line section 40, a part of which is arranged on the first substrate 10. The sealing portion 31 includes a sealing member 31a that seals the liquid crystal layer 30 between the first substrate 10 and the second substrate 20, and conductive beads 31b contained in the sealing member 31a. The counter electrode 21 is connected, via the conductive beads 31b, to the wiring line section 40 arranged on the first substrate 10 side. The plurality of counter electrodes 21 are connected, via the wiring line section 40, to a ground (GND) having a fixed potential. The alignment film 22 covers the region Ra (see FIG. 5) of the counter electrode 21. The alignment film 22 is arranged between the counter electrode 21 and the liquid crystal layer 30. The alignment film 22 transmits light in a predetermined polarization direction. The counter electrode 21 is arranged to face the plurality of segment electrodes 11 via the liquid crystal layer 30. For example, the counter electrode 21 is formed of a transparent conductive material such as indium tin oxide (ITO) and indium zinc oxide (IZO). The counter electrode 21 may be formed of a metal conductive material or a transparent conductive material formed in a mesh shape.

In the first embodiment, as illustrated in FIG. 4, the auxiliary electrode 23 is arranged at a position in the Z direction relative to the counter electrode 21. That is, the auxiliary electrode 23 is arranged on a side opposite to the side of the counter electrode 21 where the liquid crystal layer 30 is arranged. The auxiliary electrode 23 is arranged between the counter electrode 21 and the second substrate 20. The insulating layer 24 is arranged between the counter electrode 21 and the auxiliary electrode 23 in the normal direction. Thus, the auxiliary electrode 23 is arranged to face the counter electrode 21 via the insulating layer 24. In the first embodiment, the auxiliary electrode 23 is arranged within the region Ra (see FIG. 5). The auxiliary electrode 23 is disposed at a position overlapping any one of the plurality of counter electrodes 21 in a plan view. The plurality of auxiliary electrodes 23 are connected, via the sealing portion 31 (common transition) arranged between the first substrate 10 and the second substrate 20, to the wiring line section 40, a part of which is arranged on the first substrate 10. The plurality of auxiliary electrodes 23 are connected to the drive circuit 3 via the wiring line section 40.

As illustrated in FIG. 6, in the first embodiment, each of the plurality of auxiliary electrodes 23 is formed in a mesh shape. For example, the auxiliary electrode 23 has a structure in which a plurality of linear conductors intersect along the arrangement directions (the vertical direction and the horizontal direction of the diagram of FIG. 6) of pixels (not illustrated) of the display panel 2. For example, the auxiliary electrode 23 is formed of a transparent conductive material such as indium tin oxide (ITO) and indium zinc oxide (IZO). The auxiliary electrode 23 may be formed of a metal conductive material. The insulating layer 24 is formed of an insulating inorganic film or an insulating organic film.

Figure 7:
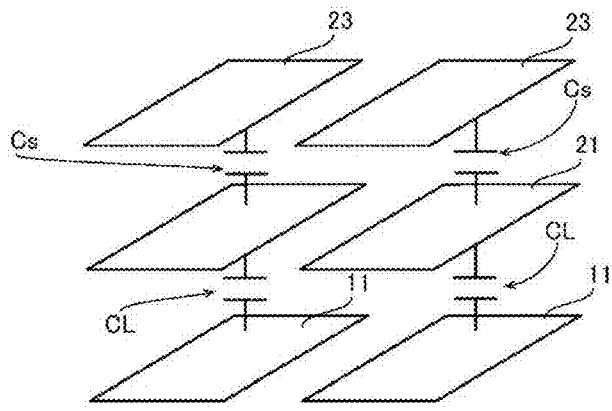
FIG. 7 is a schematic view for explaining electric capacitances Cs and CL.
Figure 8:
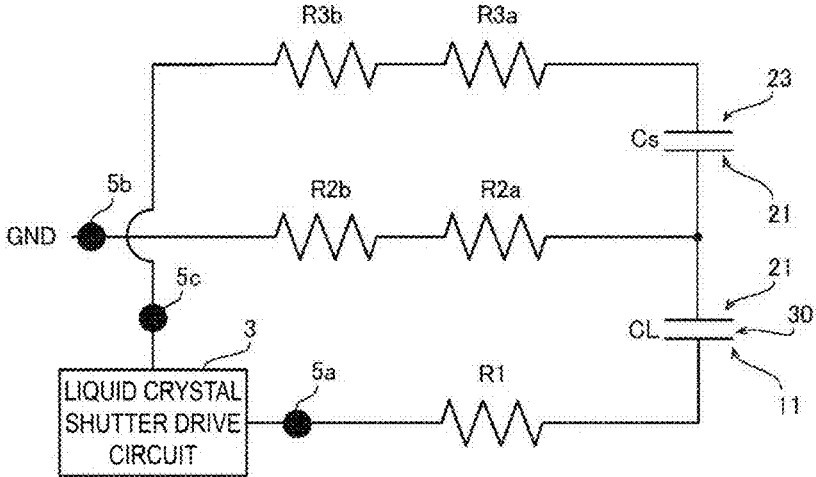
FIG. 8 is a circuit diagram schematically illustrating an electrical relationship among segment electrodes 11, the counter electrode 21, and the auxiliary electrode 23.

FIG. 7 is a schematic view for explaining electric capacitances Cs and CL. FIG. 8 is a circuit diagram schematically illustrating an electrical relationship among the segment electrodes 11, the counter electrode 21, and the auxiliary electrode 23. As illustrated in FIG. 8, a wiring line resistance R1 is formed between the segment electrodes 11 and the drive circuit 3. A wiring line resistance R2a, and a resistance R2b from common transition, are formed between the counter electrode 21 and the ground (GND). A wiring line resistance R3a, and a resistance R3b from common transition, are formed between the auxiliary electrode 23 and the drive circuit 3. The liquid crystal shutter device 1 also includes a segment electrode input terminal 5a, a counter electrode input terminal 5b, and an auxiliary electrode input terminal 5c. The liquid crystal shutter drive circuit 3 supplies a voltage to the segment electrodes 11 by inputting a voltage to the segment electrode input terminal 5a. The liquid crystal shutter drive circuit 3 supplies a voltage to the auxiliary electrode 23 by inputting a voltage to the auxiliary electrode input terminal 5c. The counter electrode input terminal 5b is connected to the ground (GND). As illustrated in FIG. 7, the plurality of counter electrodes 21 form the electric capacitance CL with each of the plurality of segment electrodes 11. The electric capacitance Cs is formed between the auxiliary electrode 23 and the counter electrode 21.

Configuration of Liquid Crystal Shutter Drive Circuit 3

Figure 9:
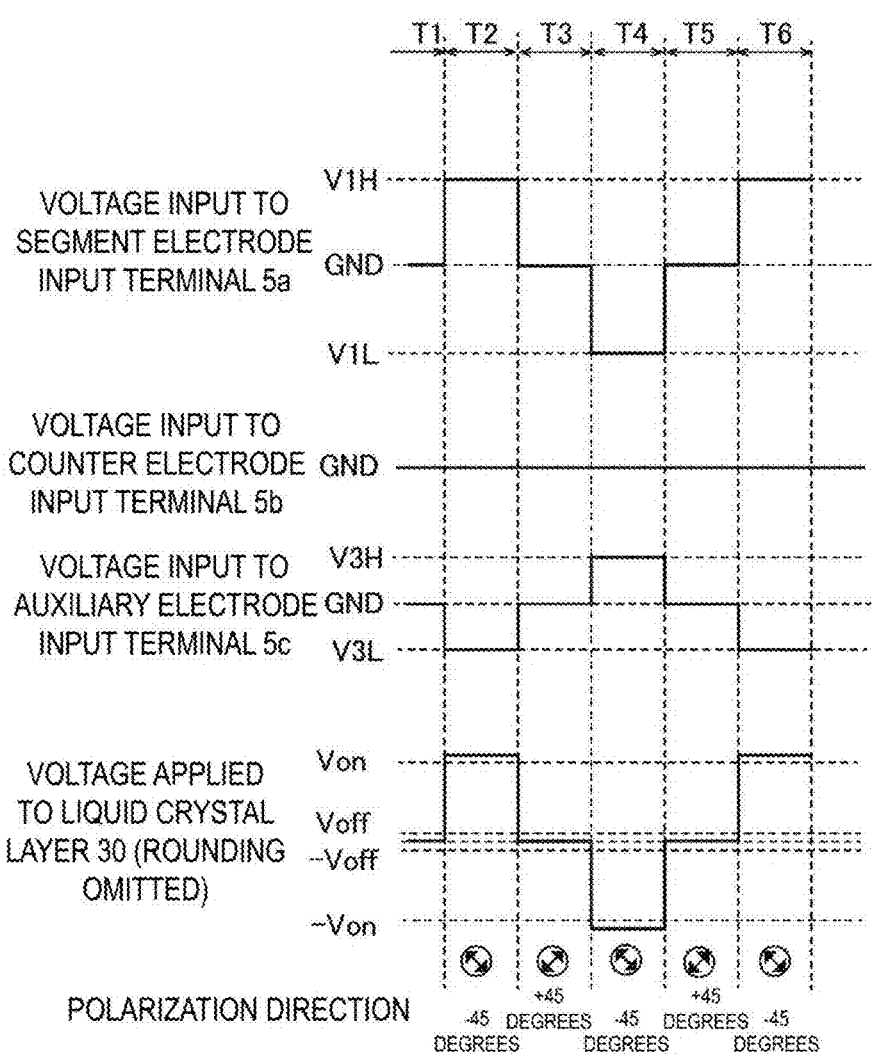
FIG. 9 is a timing diagram for explaining a relationship between the voltage applied to each electrode and the polarization direction of light emitted from the liquid crystal shutter device 1.

FIG. 9 is a timing diagram for explaining a relationship between the voltage applied to each electrode and the polarization direction of light emitted from the liquid crystal shutter device 1. In FIG. 9, for facilitating the description, the waveforms of the voltages are simplified and illustrated as a rectangular waveform.

As illustrated in FIG. 9, the drive circuit 3 applies a voltage to the segment electrodes 11 so that the polarization direction of the light emitted from the liquid crystal shutter device 1 is −45 degrees in the periods in which the display panel 2 displays the left-eye image (periods T2, T4, and T6 in FIG. 9). For example, in the period T2, the drive circuit 3 inputs a voltage V1H to the segment electrode input terminal 5a to change the absolute value of the voltage applied to the liquid crystal layer 30 from an off-threshold value Voff or less to an on-threshold value Von or greater due to the potential difference between the segment electrodes 11 and the counter electrodes 21. The drive circuit 3 applies a voltage to the segment electrodes 11 so that the polarization direction of the light emitted from the liquid crystal shutter device 1 is +45 degrees in the periods in which the display panel 2 displays the right-eye image (periods T1, T3, and T5 in FIG. 9). For example, the drive circuit 3 makes the potential of the segment electrode input terminal 5a the potential of the ground (GND) to decrease the potential difference between the segment electrodes 11 and the counter electrodes 21 and to change the absolute value of the voltage applied to the liquid crystal layer 30 from the on-threshold value Von or greater to the off-threshold value Voff or less. The light of the left-eye image having a polarization direction of −45 degrees emitted from the liquid crystal shutter device 1 is transmitted through the polarizing film 201 of the polarizing glasses 200, and the light of the right-eye image having a polarization direction of +45 degrees is transmitted through the polarizing film 202 of the polarizing glasses 200. By the drive circuit 3 repeatedly performing the operations described above, a viewer wearing the polarizing glasses 200 can view a stereoscopic image (stereoscopic moving image).

Here, as illustrated in FIG. 9, in the first embodiment, the drive circuit 3 applies a voltage having an opposite phase to the voltage applied to the segment electrode 11 to the auxiliary electrode 23. For example, the drive circuit 3 inputs a voltage V3L having a negative polarity to the auxiliary electrode input terminal 5c during the periods (the periods T2 and T6 in FIG. 9) in which the voltage V1H having a positive polarity is input to the segment electrode input terminal 5a. Also, the drive circuit 3 inputs a voltage V3H having a positive polarity to the auxiliary electrode input terminal 5c during the period (the period T4 in FIG. 9) in which a voltage V1L having a negative polarity is input to the segment electrode input terminal 5a. The drive circuit 3 also sets the potential of the auxiliary electrode input terminal 5c to the potential of the ground (GND) in the periods (periods T3 and T5 in FIG. 9) in which the potential of the segment electrode input terminal 5a is set to the potential of the ground (GND). An absolute value Vc of the voltage value of the voltage V3L is equal to the absolute value of the voltage value of the voltage V3H. Also, an absolute value Vs of the voltage value of the drive voltage V1H is equal to the absolute value of the voltage value of the drive voltage V1L. In the first embodiment, the absolute value Vc is less than the absolute value Vs. Note that the absolute value Vc may be equal to the absolute value Vs.

Assuming that the electric capacitance between the segment electrode 11 and the counter electrode 21 is CL and the electric capacitance between the counter electrode 21 and the auxiliary electrode 23 is Cs, the absolute value Vc satisfies the following equation (1).

$$Vc \le Vs \times (CL/Cs) \tag{1}$$

Comparison Result Between First Embodiment and Comparative Example

Figure 10:
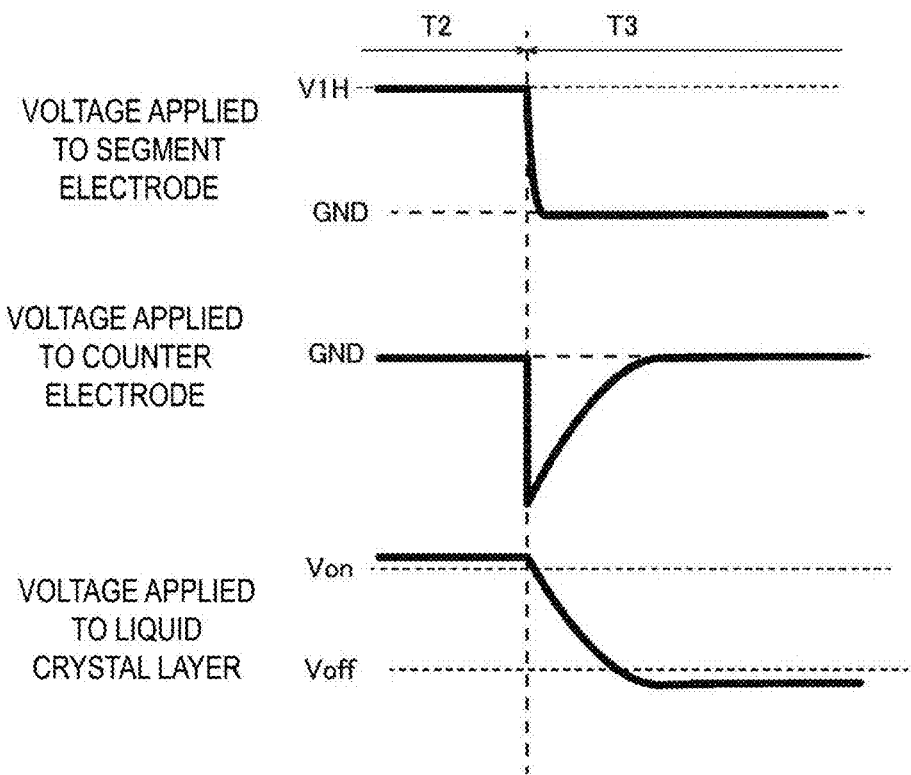
FIG. 10 is a graph illustrating waveforms of voltages applied to the segment electrode, the counter electrode, and the liquid crystal layer when transitioning from a period T2 to a period T3 according to a stereoscopic display system of the comparative example.
Figure 11:
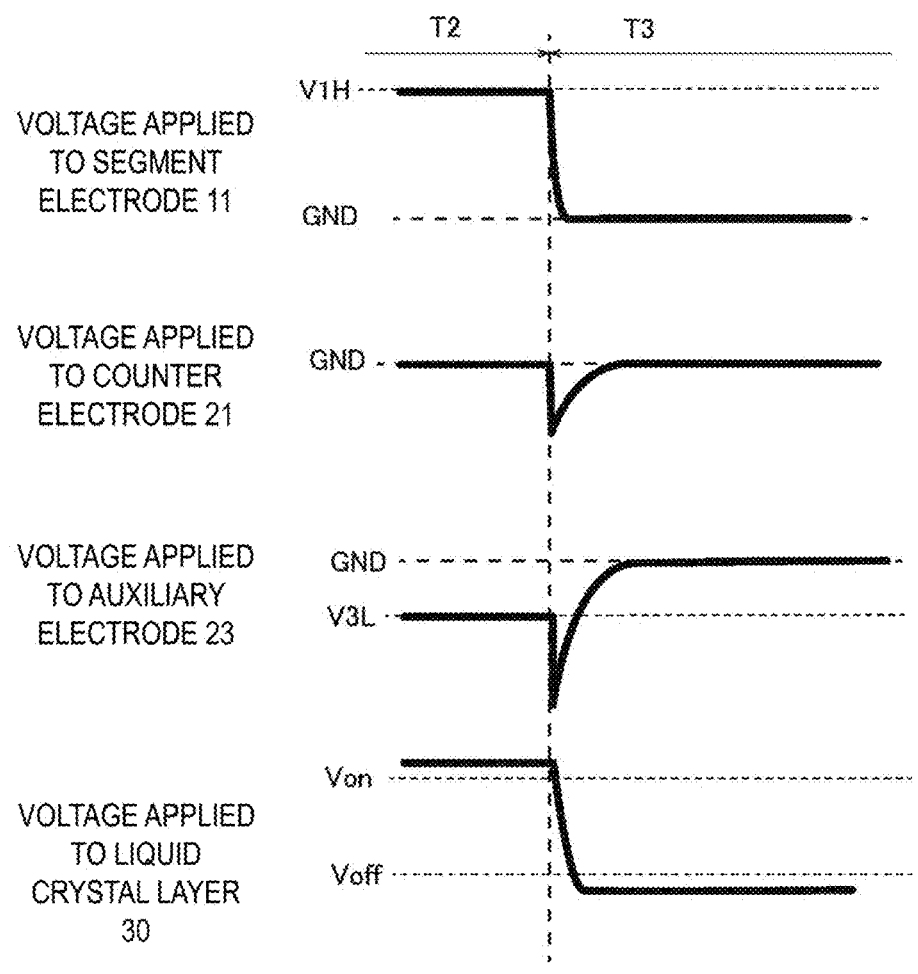
FIG. 11 is a graph illustrating waveforms of voltages applied to the segment electrodes 11, the counter electrode 21, the auxiliary electrode 23, and the liquid crystal layer 30 when transitioning from the period T2 to the period T3 according to the stereoscopic display system 100 of the first embodiment.

Next, the comparison result for the waveform of the electrodes between the stereoscopic display system 100 according to the first embodiment and a stereoscopic display system according to the comparative example will be described with reference to FIG. 10 to FIG. 11. FIG. 10 is a graph illustrating waveforms of voltages applied to the segment electrode, the counter electrode, and the liquid crystal layer when transitioning from the period T2 to the period T3 according to the stereoscopic display system of the comparative example. FIG. 11 is a graph illustrating waveforms of voltages applied to the segment electrodes 11, the counter electrode 21, the auxiliary electrode 23, and the liquid crystal layer 30 when transitioning from the period T2 to the period T3 according to the stereoscopic display system 100 of the first embodiment. FIG. 11 illustrates an example of each waveform inside the liquid crystal shutter device 1 (inside the panel).

The auxiliary electrode 23 is not provided in the stereoscopic display system according to the comparative example. Other configurations of the stereoscopic display system according to the comparative example (configurations of the display panel, the segment electrode, the counter electrode, and the like) are assumed to be the same as the configurations of the first embodiment. Note that the stereoscopic display system according to the comparative example is an example for explaining the effects of the stereoscopic display system 100 according to the first embodiment and is not illustrative of a known technique.

As illustrated in FIG. 10, in the stereoscopic display system according to the comparative example, the drive voltage V1H is supplied to the segment electrode in the period T2. The drive voltage V1H is a positive voltage with respect to the potential of the ground. In the period T2, the potential of the counter electrode becomes equal to the potential of the ground. In the stereoscopic display system according to the comparative example, the potential of the segment electrode becomes equal to the potential of the ground in the period T3 after the period T2. Here, since the potential of the segment electrode changes from V1H to the potential of the ground, the potential of the counter electrode changes to a negative potential with respect to the potential of the ground (fixed potential). Thus, the speed at which the voltage applied to the liquid crystal layer decreases is decreased (the waveform becomes rounded), and the time taken for the voltage becomes equal to or less than the off-threshold value Voff increases.

As illustrated in FIG. 11, in the first embodiment, the drive circuit 3 supplies the drive voltage V1H to the segment electrodes 11 during the period T2. During the period T2, the drive circuit 3 applies the voltage V3L having a polarity opposite to that of the voltage applied to the segment electrodes 11 to the auxiliary electrode 23. The potential of the counter electrode 21 becomes equal to the potential of the ground. In the period T3, the drive circuit 3 makes the potential of the segment electrodes 11 equal to the potential of the ground. In other words, in the first embodiment, the drive circuit 3 applies a voltage having an opposite phase to the voltage applied to the segment electrode 11 to the auxiliary electrode 23. Here, since the potential of the segment electrodes 11 changes from V1H to the potential of the ground, the potential of the counter electrode 21 changes to a negative potential with respect to the potential of the ground (fixed potential). The potential of a portion of the auxiliary electrode 23 that overlaps the segment electrodes 11 in a plan view also becomes a value lower than the voltage V3L due to the change in the potential of the segment electrodes 11.

However, in the first embodiment, a voltage having an opposite phase to the voltage input to the segment electrode input terminal 5a is input to the auxiliary electrode input terminal 5c (see FIG. 9). Thus, the potential of the counter electrode 21 can be changed in a phase opposite to the change in potential caused by the segment electrodes 11. As a result, as illustrated in FIG. 11, in the liquid crystal shutter device 1 (in the panel), the change in the potential caused by the auxiliary electrode 23 cancels out the change in the potential caused by the segment electrodes 11, so that a change in the potential of the counter electrode 21 can be suppressed. That is, according to the first embodiment, as compared with the stereoscopic display system according to the comparative example, the speed at which the voltage applied to the liquid crystal layer 30 decreases is high (the rounding of the waveform is prevented), and the time taken for the voltage to become equal to or less than the off-threshold value Voff can be decreased. As a result, it is possible to prevent a delay in the timing when the polarization direction of light is changed by the liquid crystal shutter device 1 with respect to the display timing of the display panel 2.

Examples of First Embodiment

Next, first to fifth examples of the first embodiment will be described with reference to FIG. 12. The stereoscopic display system according to the first example is different from the stereoscopic display system 100 in that an electric capacitance Cs1 is equal to the electric capacitance CL (Cs1=CL) and the absolute value Vc1 of the voltage value of the voltage applied to the auxiliary electrode 23 is equal to the absolute values Vs of the voltage value of the voltage applied to the segment electrodes 11 (Vc1=Vs). The stereoscopic display system according to the second example is different from the stereoscopic display system 100 in that an electric capacitance Cs2 is twice the electric capacitance CL (Cs2=2×CL) and an absolute value Vc2 of the voltage value of the voltage applied to the auxiliary electrode 23 is half the absolute values Vs of the voltage value of the voltage applied to the segment electrodes 11 (Vc2=Vs×0.5). The stereoscopic display system according to the third example is different from the stereoscopic display system 100 in that an electric capacitance Cs3 is four times the electric capacitance CL (Cs3=4×CL) and an absolute value Vc3 of the voltage value of the voltage applied to the auxiliary electrode 23 is 0.25 times the absolute values Vs of the voltage value of the voltage applied to the segment electrodes 11 (Vc3=Vs×0.25). The stereoscopic display system according to the fourth example is different from the stereoscopic display system 100 in that an electric capacitance Cs4 is ten times the electric capacitance CL (Cs4=10×CL) and an absolute value Vc4 of the voltage value of the voltage applied to the auxiliary electrode 23 is 0.1 times the absolute values Vs of the voltage value of the voltage applied to the segment electrodes 11 (Vc4=Vs×0.1). The stereoscopic display system according to the fifth example is different from the stereoscopic display system 100 in that an electric capacitance Cs5 is equal the electric capacitance CL (Cs5=CL) and an absolute value Vc5 of the voltage value of the voltage applied to the auxiliary electrode 23 is 0.75 times the absolute values Vs of the voltage value of the voltage applied to the segment electrodes 11 (Vc5=Vs×0.75). For example, CL=5 μF and Vs=10 V, but the disclosure is not limited to this numerical example.

Figure 12:
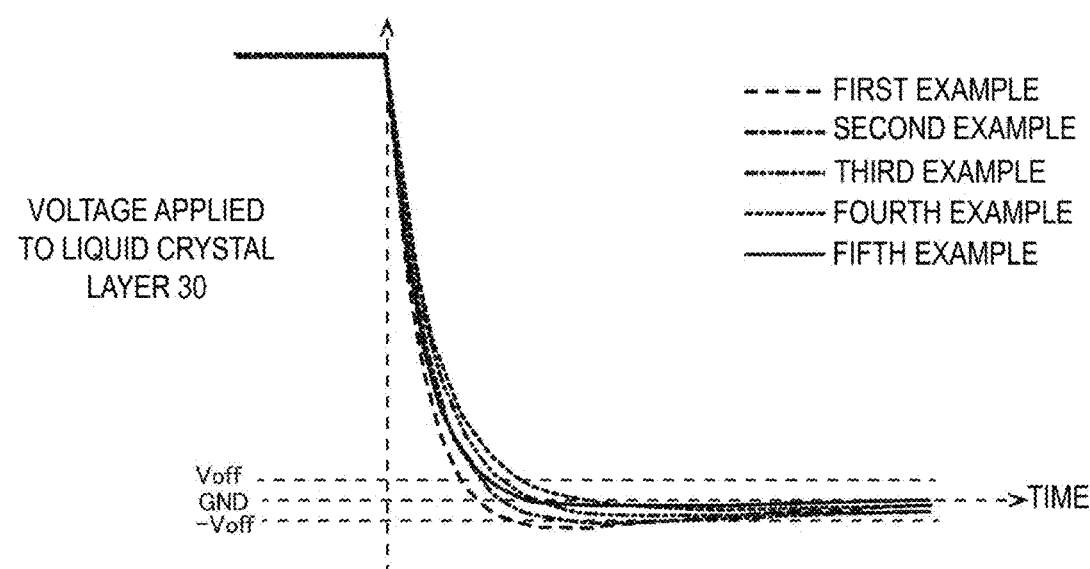
FIG. 12 is a diagram illustrating a change in voltage applied to the liquid crystal layer in each of first to fifth examples.

FIG. 12 is a diagram illustrating a change in voltage applied to the liquid crystal layer in each of the first to fifth examples. FIG. 12 shows the measurement results of the voltage values of the voltages applied to the liquid crystal layer in the first to fifth examples when transitioning from the period T2 to the period T3. Among the first to fifth examples, in the first example, after the start of period T3, the voltage value of the voltage applied to the liquid crystal layer became lower than the off-threshold value Voff (the time constant became smaller) at the earliest time point. In addition, the time constants were, in order from the smallest, the first example, the second example, the fifth example, the third example, and the fourth example. In addition, among the first to fifth examples, in the fifth example, after the start of the period T3, the magnitude (overshoot voltage) of the voltage value of the voltage applied to the liquid crystal layer exceeding the potential of the ground was the smallest. In addition, the overshoot voltages were, in order from the smallest, the fifth example, the fourth example, the third example, the second example, and the first example.

From the results illustrated in FIG. 12, it was found that the smaller the electric capacitance Cs and the larger the absolute value Vc, the smaller the time constant of the voltage applied to the liquid crystal layer. It was also found that the smaller the absolute value Vc is, the smaller the overshoot voltage is. It was also found that the fifth embodiment can reduce the overshoot voltage while reducing the time constant of the voltage applied to the liquid crystal layer.

Second Embodiment

Figure 13:
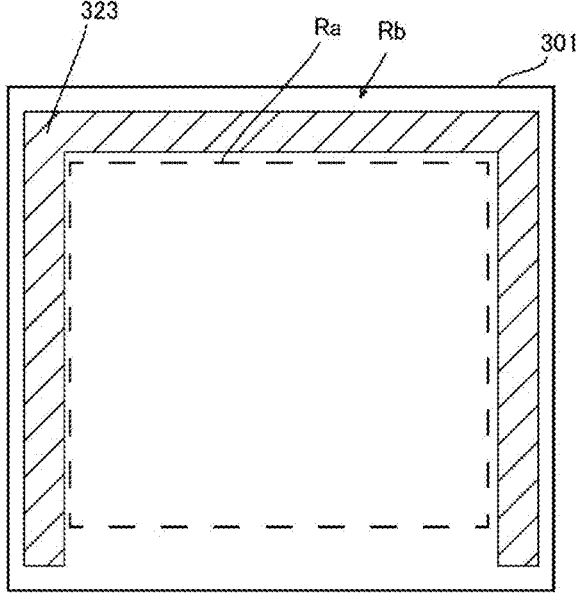
FIG. 13 is a plan view of a liquid crystal shutter device 301 according to a second embodiment.
Figure 14:
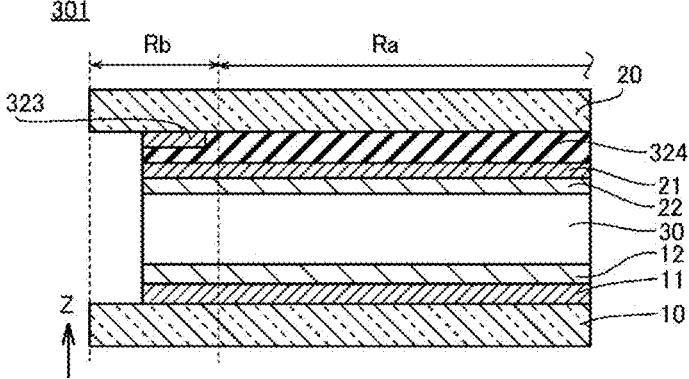
FIG. 14 is a cross-sectional view of the liquid crystal shutter device 301 according to the second embodiment.

Next, a configuration of a liquid crystal shutter device 301 according to a second embodiment will be described with reference to FIGS. 13 and 14. Constituents that are the same as those in the first embodiment are denoted by the same reference signs, and description thereof will be omitted. FIG. 13 is a plan view of the liquid crystal shutter device 301 according to the second embodiment. FIG. 14 is a cross-sectional view of the liquid crystal shutter device 301 according to the second embodiment.

As illustrated in FIG. 13, the liquid crystal shutter device 301 according to the second embodiment includes an auxiliary electrode 323. The auxiliary electrode 323 is arranged outside the region Ra where the liquid crystal shutter device 301 emits light in a plan view. For example, the auxiliary electrode 323 is arranged in a frame region Rb. Thus, according to the second embodiment, it is possible to prevent the auxiliary electrode 323 from blocking light from the display panel 2. Thus, the light transmittance of the liquid crystal shutter device 301 can be improved. The auxiliary electrode 323 is formed in a U-shape in a plan view. For example, a wiring line section (not illustrated) is arranged at a base of the U-shaped auxiliary electrode 323 (on a lower side of a sheet surface in FIG. 13). The auxiliary electrode 323 is connected to the drive circuit 3 via the wiring line section. For example, the auxiliary electrode 323 is formed of a metal material (such as copper, silver, gold, aluminum, or the like).

As illustrated in FIG. 14, the auxiliary electrode 323 is arranged to face the counter electrode 21 via an insulating layer 324. Also, the drive circuit 3 (see FIG. 1) applies a voltage having an opposite phase to the voltage applied to the segment electrode 11 to the auxiliary electrode 323. Accordingly, since the change in the potential of the counter electrode 21 is suppressed, it is possible to reduce the time taken for the voltage applied to the liquid crystal layer 30 to become equal to or less than the off-threshold value Voff from a state in which the voltage is greater than the off-threshold value Voff. As a result, it is possible to prevent a delay in the timing when the polarization direction of light is changed by the liquid crystal shutter device 301 with respect to the display timing of the display panel 2. Other configurations and effects are similar to the configurations and effects in the first embodiment.

Modified Examples

Although embodiments of the disclosure have been described above, the embodiments described above are merely examples for implementing the disclosure. Thus, the disclosure is not limited to the embodiments described above, and can be implemented by appropriately modifying the embodiments described above without departing from the scope. Now, modified examples of the above-described embodiments will be described.

Figure 15:
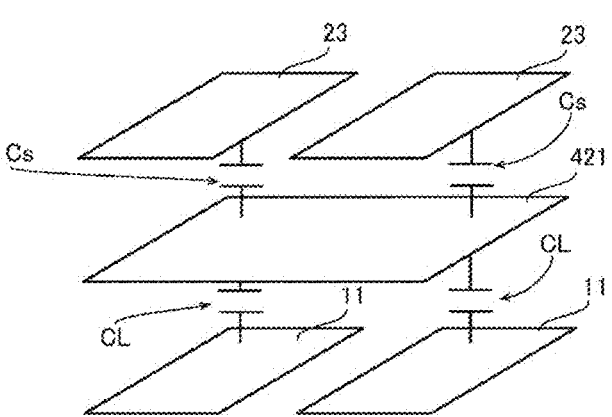
FIG. 15 is a plan view of a liquid crystal shutter device 401 according to a first modified example of the first embodiment and the second embodiment.

(1) In the first and second embodiments described above, the counter electrode of the disclosure includes a plurality of portions (a plurality of counter electrodes) separate from each other, but the disclosure is not limited to this example. For example, as in a liquid crystal shutter device 401 according to a first modified example illustrated in FIG. 15, a single counter electrode 421 may be provided in the liquid crystal shutter device 401.

Figure 16:
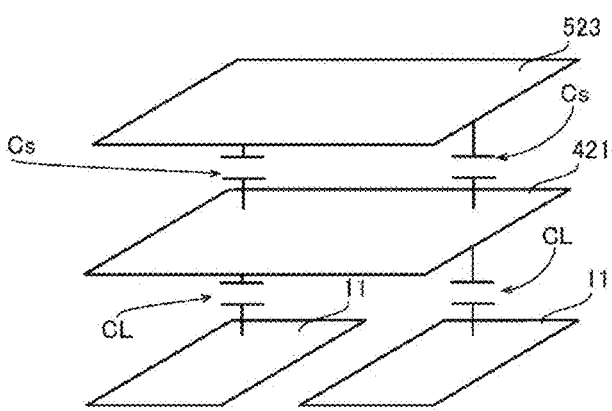
FIG. 16 is a plan view of a liquid crystal shutter device 501 according to a second modified example of the first embodiment and the second embodiment.

(2) In the first and second embodiments described above, the auxiliary electrode of the disclosure includes a plurality of portions (a plurality of auxiliary electrodes) separate from each other, but the disclosure is not limited to this example. For example, as in a liquid crystal shutter device 501 according to a second modified example illustrated in FIG. 16, a single auxiliary electrode 523 may be provided in the liquid crystal shutter device 501.

Figure 17:
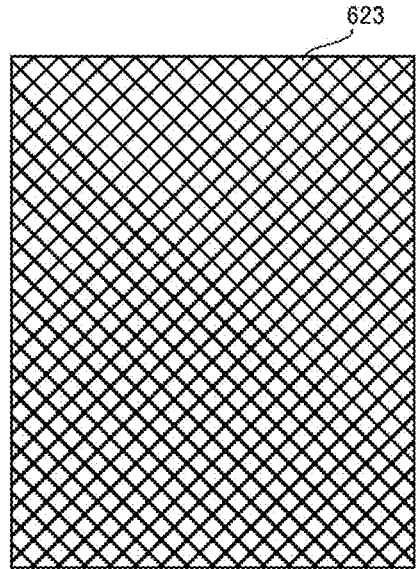
FIG. 17 is a plan view of an auxiliary electrode 623 according to a third modified example of the first embodiment and the second embodiment.

(3) In the first and second embodiments described above, the auxiliary electrode has a structure in which a plurality of linear conductors intersect along the arrangement directions (the vertical direction and the horizontal direction of the diagram of FIG. 6) of the pixels, but the disclosure is not limited to this example. For example, as with auxiliary electrodes 623 according to a third modified example illustrated in FIG. 17, the auxiliary electrodes 523 may have a structure in which a plurality of linear conductors intersect in the directions (diagram diagonal directions) intersecting the arrangement directions of the pixels.

(4) In the first and second embodiments described above, the counter electrode is connected to the ground (GND), but the disclosure is not limited to this example. That is, a predetermined voltage having a potential (fixed potential) other than the ground (GND) may be applied from the drive circuit to the counter electrode, without connecting the counter electrode to the ground (GND).

(5) In the first and second embodiments described above, a ground voltage is applied to the segment electrodes, but the disclosure is not limited to this example. That is, if the polarization direction of the light emitted from the liquid crystal shutter device can be switched, a voltage value different from the potential of the ground may be applied to the segment electrodes during the above-described period in which the ground voltage is applied.

(6) In the first embodiment described above, the auxiliary electrode is arranged in the region Ra, and in the second embodiment described above, the auxiliary electrode is arranged outside the region Ra (inside the region Rb). However, the disclosure is not limited thereto. For example, the auxiliary electrode may be arranged both inside the region Ra and inside the region Rb.

(7) In the second embodiment described above, the auxiliary electrode is formed in a U-shape in a plan view, but the disclosure is not limited to this example. For example, the auxiliary electrode may be formed in an I shape, a circular shape, or a quadrangular shape.

(8) In the first and second embodiments described above, as an example of the polarization state of the emission light being switched by the liquid crystal shutter device, the polarization direction of the linearly polarized light is switched. However, the disclosure is not limited to this example. For example, the rotation direction of the circularly polarized light may be switched by a liquid crystal shutter device. In this case, if an optical member that blocks one of the left-handed circularly-polarized light and the right-handed circularly-polarized light is disposed in the left-eye rim of polarizing glasses and an optical member that blocks the other is disposed in the right-eye rim of the polarizing glasses, the user can see a stereoscopic image.

The above-described stereoscopic display system and the liquid crystal shutter device can also be described as follows.

A stereoscopic display system according to a first configuration includes: a display panel configured to alternately switch and display a left-eye image and a right-eye image; and a liquid crystal shutter device configured to switch between a state where light incident from the display panel is changed into emission light having a first polarization state and the emission light is output and a state where light incident from the display panel is changed into emission light having a second polarization state and the emission light is output, wherein the liquid crystal shutter device includes: a first electrode; a second electrode connected to a fixed potential; a liquid crystal layer arranged between the first electrode and the second electrode; a drive circuit configured to apply, to the first electrode, any one of a first voltage changing a polarization state of the emission light into the first polarization state and a second voltage changing the polarization state of the emission light into the second polarization state, the drive circuit being configured to switch a voltage applied to the first electrode between the first voltage and the second voltage in synchronization with the display panel switching between a display of the left-eye image and a display of the right-eye image; and a third electrode arranged on a side of the second electrode opposite to a side where the liquid crystal layer is arranged, and the drive circuit applies a third voltage having an opposite phase to the voltage applied to the first electrode to the third electrode (first configuration).

Here, the potential of the second electrode changes with respect to the fixed potential due to the first voltage being applied to the first electrode. According to the first configuration described above, the third voltage having an opposite phase to the voltage applied to the first electrode is applied to the third electrode. Thus, the potential of the second electrode can be changed in a phase opposite to the change in potential caused by the first voltage. As a result, since the change in the potential caused by the third voltage is cancelled out by the change in the potential caused by the first voltage, it is possible to prevent an increase in the time constant of the waveform of the voltage applied to the liquid crystal layer (rounding of the waveform). Accordingly, a delay in the timing when the polarization state of the light emitted from the liquid crystal shutter device is switched with respect to the timing when the voltage applied to the first electrode is switched between the first voltage and the second voltage is prevented. The timing when the voltage applied to the first electrode is switched between the first voltage and the second voltage is synchronized with the timing (display timing) when the left-eye image and the right-eye image are switched, so that it is possible to prevent a delay in the timing when the polarization state of light is changed by the liquid crystal shutter device with respect to the display timing of the display panel.

In the first configuration, the drive circuit may apply, to the third electrode, the third voltage having an absolute value of a voltage value equal to or less than one of an absolute value of a voltage value of the first voltage and an absolute value of a voltage value of the second voltage (second configuration).

According to the second configuration, it is possible to prevent the change in the potential of the second electrode caused by the third voltage from exceeding a magnitude that cancels out the change in the potential of the second electrode caused by the first voltage.

In the first configuration and the second configuration, the drive circuit may apply the third voltage having a voltage value of an absolute value Vc satisfying equation (1a) below to the third electrode, where an absolute value of a voltage value of the first voltage or an absolute value of a voltage value of the second voltage is Vs, an electric capacitance between the first electrode and the second electrode is CL, and an electric capacitance between the second electrode and the third electrode is Cs (third configuration).

$$Vc \le Vs \times (CL/Cs) \tag{1a}$$

According to the third configuration, it is possible to prevent the change in the potential of the second electrode caused by the third voltage from exceeding a magnitude that cancels out the change in the potential of the second electrode caused by the first voltage, and the time constant of the waveform of the voltage applied to the liquid crystal layer can be reduced the most.

In any one of the first to third configurations, the third electrode may be formed in a mesh shape (fourth configuration).

According to the fourth configuration, since the light is not blocked in the gap of the mesh of the third electrode, the light transmittance of the liquid crystal shutter device can be improved.

In any one of the first to fourth configuration, the third electrode may be arranged at a position outside a region of the liquid crystal shutter device where the liquid crystal shutter device emits light (fifth configuration).

According to the fifth configuration, since the third electrode is arranged at a position outside the region that affects display, it is possible to prevent the third electrode from affecting display.

In any one of the first to fifth configurations, the first electrode may include a plurality of first electrode portions arranged separated from each other. The second electrode may include a plurality of second electrode portions arranged facing the plurality of first electrode portions. The third electrode may include a plurality of third electrode portions arranged facing the plurality of second electrode portions (sixth configuration).

According to the sixth configuration, it is possible to reduce the electric capacitance between the first electrode and the second electrode and the electric capacitance between the second electrode and the third electrode. Accordingly, it is possible to reduce the time constant of the waveform of the voltage applied to the liquid crystal layer.

A liquid crystal shutter device according to a seventh configuration is configured to switch between a state where light incident from a display panel configured to alternately switch and display a left-eye image and a right-eye image is changed into emission light having a first polarization state and the emission light is output and a state where light incident from the display panel is changed into emission light having a second polarization state and the emission light is output, and includes: a first electrode; a second electrode connected to a fixed potential; a liquid crystal layer arranged between the first electrode and the second electrode; a drive circuit configured to apply, to the first electrode, any one of a first voltage changing a polarization state of the emission light into the first polarization state and a second voltage changing the polarization state of the emission light into the second polarization state, the drive circuit being configured to switch a voltage applied to the first electrode between the first voltage and the second voltage in synchronization with the display panel switching between a display of the left-eye image and a display of the right-eye image; and a third electrode arranged on a side of the second electrode opposite to a side where the liquid crystal layer is arranged, wherein the drive circuit applies a third voltage having an opposite phase to the voltage applied to the first electrode to the third electrode (seventh configuration).

According to the seventh configuration described above, it is possible to provide a liquid crystal shutter device capable of preventing a delay in the timing when the polarization state of light is changed by the liquid crystal shutter device with respect to the display timing of the display panel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stereoscopic display system, comprising:

a display panel configured to alternately switch and display a left-eye image and a right-eye image; and a liquid crystal shutter device configured to switch between:

a state in which light incident from the display panel is changed into first emission light having a first polarization state and the first emission light is output, and a state in which the light incident from the display panel is changed into second emission light having a second polarization state and the second emission light is output, wherein the liquid crystal shutter device includes:

a first electrode, a first substrate on which the first electrode is formed, a second electrode applied with a fixed potential, a third electrode, a second substrate on which the second electrode and the third electrode are formed, a liquid crystal layer arranged between the first electrode and the second electrode, and a drive circuit configured to:

apply, to the first electrode, any one of a first voltage changing a polarization state of the first emission light into the first polarization state and a second voltage changing the polarization state of the second emission light into the second polarization state, and switch a voltage applied to the first electrode between the first voltage and the second voltage in synchronization with the display panel switching between a display of the left-eye image and a display of the right-eye image;

in a direction normal to the first substrate, the liquid crystal shutter device is configured, such that the first substrate, the first electrode, the liquid crystal layer, the second electrode, the third electrode, and the second substrate are sequentially arranged, and the drive circuit is further configured to:

apply a third voltage, having an opposite phase to the voltage applied to the first electrode, to the third electrode, and drive liquid crystals of the liquid crystal layer by varying potentials of the first electrode and the third electrode while the fixed potential is applied to the second electrode.

2. The stereoscopic display system according to claim 1, wherein the drive circuit is further configured to apply, to the third electrode, the third voltage having a relative voltage value with respect to the fixed potential that is equal to or less than one of a relative voltage value of the first voltage with respect to the fixed potential and a relative voltage value of the second voltage with respect to the fixed potential.

3. The stereoscopic display system according to claim 1, wherein the drive circuit is further configured to apply the third voltage, having a relative voltage value of Vc satisfying an equation (1) below, to the third electrode, a relative voltage value of the first voltage with respect to the fixed potential or a relative voltage value of the second voltage with respect to the fixed potential is Vs, an electric capacitance between the first electrode and the second electrode is CL, and an electric capacitance between the second electrode and the third electrode is Cs, $$Vc \leq Vs \times (CL/Cs) \tag{1}.$$

4. The stereoscopic display system according to claim 1, wherein the third electrode is formed in a mesh shape.

5. The stereoscopic display system according to claim 1, wherein the third electrode is arranged in a frame region.

6. The stereoscopic display system according to claim 1, wherein the first electrode includes a plurality of first electrode portions arranged separated from each other, the second electrode includes a plurality of second electrode portions arranged facing the plurality of first electrode portions, and the third electrode includes a plurality of third electrode portions arranged facing the plurality of second electrode portions.

7. A liquid crystal shutter device configured to switch between (i) a state in which light incident from a display panel that is configured to alternately switch and display a left-eye image and a right-eye image is changed into first emission light having a first polarization state and the first emission light is output and (ii) a state in which light incident from the display panel is changed into second emission light having a second polarization state and the second emission light is output, the liquid crystal shutter device comprising:

a first electrode;

a first substrate on which the first electrode is formed;

a second electrode applied with a fixed potential;

a third electrode;

a second substrate on which the second electrode and the third electrode are formed;

a liquid crystal layer arranged between the first electrode and the second electrode; and a drive circuit configured to:

apply, to the first electrode, any one of a first voltage changing a polarization state of the first emission light into the first polarization state and a second voltage changing the polarization state of the second emission light into the second polarization state, and switch a voltage applied to the first electrode between the first voltage and the second voltage in synchronization with the display panel switching between a display of the left-eye image and a display of the right-eye image, wherein in a direction normal to the first substrate, the liquid crystal shutter device is configured, such that the first substrate, the first electrode, the liquid crystal layer, the second electrode, the third electrode, and the second substrate are sequentially arranged, and the drive circuit is further configured to:

apply a third voltage, having an opposite phase to the voltage applied to the first electrode, to the third electrode, and drive liquid crystals of the liquid crystal layer by varying potentials of the first electrode and the third electrode while the fixed potential is applied to the second electrode.

* * * * *